(12) United States Patent
Tsukahara et al.

(10) Patent No.: US 12,066,854 B2
(45) Date of Patent: Aug. 20, 2024

(54) DATA PROCESSING DEVICE, IMAGE READING APPARATUS, IMAGE FORMING APPARATUS, AND METHOD FOR PROCESSING DATA

(71) Applicants: Hajime Tsukahara, Kanagawa (JP); Tomohiro Sasa, Tokyo (JP)

(72) Inventors: Hajime Tsukahara, Kanagawa (JP); Tomohiro Sasa, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/766,254

(22) PCT Filed: Nov. 20, 2020

(86) PCT No.: PCT/IB2020/060948
§ 371 (c)(1),
(2) Date: Apr. 4, 2022

(87) PCT Pub. No.: WO2021/116801
PCT Pub. Date: Jun. 17, 2021

(65) Prior Publication Data
US 2024/0103560 A1    Mar. 28, 2024

(30) Foreign Application Priority Data
Dec. 13, 2019    (JP) ................. 2019-225642

(51) Int. Cl.
*G06F 1/10* (2006.01)
*G06F 1/12* (2006.01)
*G06F 11/07* (2006.01)

(52) U.S. Cl.
CPC ............ *G06F 1/10* (2013.01); *G06F 1/12* (2013.01); *G06F 11/0733* (2013.01);
(Continued)

(58) Field of Classification Search
CPC ..... G06F 1/10; G06F 1/12; G06F 1/14; G06F 11/002; G06F 11/0733; G06F 11/0793;
(Continued)

(56) References Cited

U.S. PATENT DOCUMENTS 5,384,645 A * 1/1995 Hasegawa ............ H04N 1/3877
382/296
5,508,823 A * 4/1996 Kiyohara ............. H04N 1/4092
358/463
(Continued)

FOREIGN PATENT DOCUMENTS

EP    3713206 A1    9/2020
JP    2011-119801 A    6/2011
(Continued)

OTHER PUBLICATIONS

International Search Report issued on Feb. 12, 2021 in PCT/IB2020/060948 filed on Nov. 20, 2020, 12 pages.
(Continued)

*Primary Examiner* — Thomas J. Cleary
(74) *Attorney, Agent, or Firm* — XSENSUS LLP

(57) ABSTRACT

A data processing device comprises: a data receiver to receive data to be processed, an external clock, and a unit control signal determining a processing unit for the data to be processed from an outside, the data receiver including a PLL circuit to receive the external clock; a clock abnormality detector to operate based on a clock of a system different from a system of the external clock and detect abnormality of the external clock based on a lock signal output from the PLL circuit; and a data processing controller to control processing of the data. When abnormality of the external clock is detected, the data processing controller stops taking in the data to be processed, and when the external clock
(Continued)

becomes normal again, take in the unit control signal and resume taking in the data to be processed.

12 Claims, 8 Drawing Sheets

(52) U.S. Cl.
CPC ...... G06F 11/0751 (2013.01); G06F 11/0772 (2013.01); G06F 11/0793 (2013.01)

(58) Field of Classification Search
CPC ............. G06F 13/4256; G06F 13/4291; G06F 11/0751; G06F 11/0772
See application file for complete search history.

(56) References Cited

U.S. PATENT DOCUMENTS

| | | | |
|---|---|---|---|
| 6,222,400 B1 | 4/2001 | Fukuda et al. | |
| 2001/0048067 A1* | 12/2001 | Matsumoto | H04B 10/697 |
| | | | 250/214 AG |
| 2007/0205355 A1* | 9/2007 | Kikuchi | H04N 1/203 |
| | | | 250/234 |
| 2008/0198418 A1* | 8/2008 | Nagatsuma | H04N 1/0083 |
| | | | 358/2.1 |
| 2008/0225344 A1 | 9/2008 | Okamoto | |
| 2009/0147610 A1 | 6/2009 | Shikata | |
| 2010/0309319 A1 | 12/2010 | Yanada et al. | |
| 2011/0057735 A1* | 3/2011 | Honda | G06F 1/04 |
| | | | 331/57 |
| 2011/0128590 A1 | 6/2011 | Kitai | |
| 2011/0175653 A1* | 7/2011 | Tani | H03L 7/095 |
| | | | 327/156 |
| 2012/0063556 A1* | 3/2012 | Hoang | H03L 7/183 |
| | | | 375/371 |
| 2013/0050176 A1* | 2/2013 | Kim | G09G 3/3688 |
| | | | 345/87 |
| 2017/0288684 A1* | 10/2017 | Ogihara | H03L 7/095 |
| 2017/0302285 A1* | 10/2017 | Niwa | H03B 5/36 |
| 2019/0075215 A1* | 3/2019 | Tanaka | H04N 1/00037 |
| 2019/0101843 A1* | 4/2019 | Kamei | G03G 15/553 |
| 2019/0385498 A1* | 12/2019 | Murakami | G09G 5/006 |
| 2020/0301468 A1 | 9/2020 | Sasa et al. | |
| 2021/0321015 A1* | 10/2021 | Shibusawa | H04N 1/409 |

FOREIGN PATENT DOCUMENTS

| | | |
|---|---|---|
| JP | 2013-150072 | 8/2013 |
| JP | 2014-236299 A | 12/2014 |
| JP | 2015-012400 | 1/2015 |
| JP | 2020-156041 | 9/2020 |

OTHER PUBLICATIONS

Japanese Office Action issued Jul. 11, 2023 in Japanese Patent Application No. 2019-225642 corresponding to the above-identified U.S. patent application, 13pp.

* cited by examiner

DATA PROCESSING DEVICE, IMAGE READING APPARATUS, IMAGE FORMING APPARATUS, AND METHOD FOR PROCESSING DATA

CROSS-REFERENCE TO RELATED APPLICATION

The present application is based on PCT filing PCT/IB2020/060948, filed Nov. 20, 2020, which claims priority to JP 2019-225642, filed Dec. 13, 2019, the entire contents of each are incorporated herein by reference.

TECHNICAL FIELD

The present disclosure relates to a data processing device, an image reading apparatus, an image forming apparatus, and a method for processing data.

BACKGROUND ART

A data processing device has been known that executes predetermined data processing on data to be processed received from an external device via a transmission line. The data processing device is installed in various apparatuses. For example, the above-described data processing device is installed in an image reading apparatus such as a scanner. The data processing device receives image data via a transmission line from a data acquisition device that acquires image data using an image sensor or the like, performs predetermined data processing on the received image data, and outputs the processed image data to another downstream device.

The data processing device generates an internal clock required for data processing from a clock signal received together with data to be processed (for example, image data) from the outside. When noise of a clock signal during transmission is superimposed on the data to be processed because of the influence of, for example, static electricity, normal data processing is no longer available. When noise is mixed to data (including a clock) received from an external device during transmission of the data and abnormality is detected, a data processing device of related art eliminates data to be processed in the period with the abnormality and handles residual data as data to be processed.

However, in the case of the above-described data processing device that deletes abnormal data, when noise frequently occurs, lack of data to be processed increases. This case may lead to a situation in which data processing is not normally performed by the downstream device. When data to be processed is, for example, image data, an abnormal image in which lack of pixels appears as a line or an abnormal image with a shift between pixels during main scanning is generated. Since such an abnormal image is detected using an external clock, abnormality is no longer normally detected because of the influence of noise. In this case, a synchronization signal (line synchronization, page synchronization, or the like) is not normally taken in due to abnormality of the clock, the downstream device is no longer able to normally perform processing on image data, and the operation of the device may be stopped.

Moreover, a technology has been known that generates a reference signal for lock determination using a clock supplied from a system different from the system of the clock signal from the outside to determine whether a synchronization signal transmitted from the outside is locked (whether synchronization is kept properly).

Furthermore, a technology has been disclosed that receives image data and a transmission signal including an external synchronization signal through serial communication, detects the line as being abnormal when the period of the external synchronization signal does not match the period of an internal synchronization signal, and deletes image data written in the line memory (see JP-6049554-B).

CITATION LIST

Patent Literature

[PTL 1]
JP-6049554-B

SUMMARY OF INVENTION

Technical Problem

The technique disclosed in JP-6049554-B presupposes a stable serial-transmission clock and deletes data in a period in which abnormality occurs in a line synchronization signal. When the serial-transmission clock is abnormal because of the influence of noise, a downstream clock is not generated, and a circuit for detecting abnormality in data no longer normally operates, and hence defective influence on image quality is not reduced. In addition, since the abnormal image line is deleted (eliminated), when noise frequently occurs, the number of lines decreases, and a system may stall or unnecessary data is required to be added.

Solution to Problem

According to one or more embodiments, a data processing device is provided, which includes: a data receiver to receive data to be processed, an external clock, and a unit control signal determining a processing unit for the data to be processed from an outside, the data receiver including a PLL circuit to receive the external clock; a clock abnormality detector to operate based on a clock of a system different from a system of the external clock and detect abnormality of the external clock based on a lock signal output from the PLL circuit; and a data processing controller to control processing of the data. When abnormality of the external clock is detected, the data processing controller stops taking in the data to be processed, and when the external clock becomes normal again, take in the unit control signal and resume taking in the data to be processed.

According to one or more embodiments, an image reading apparatus is provided, which includes a data acquisition device configured to transmit optically read image data together with a clock signal, and the data processing device.

According to one or more embodiments, an image forming apparatus is provided, which includes an image forming section to form an image on a recording medium using the data processed by the data processing device.

Advantageous Effects of Invention

With the present disclosure, although noise is superimposed on a signal received from the outside, the influence on data processing on data to be processed included in the received signal can be reduced.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
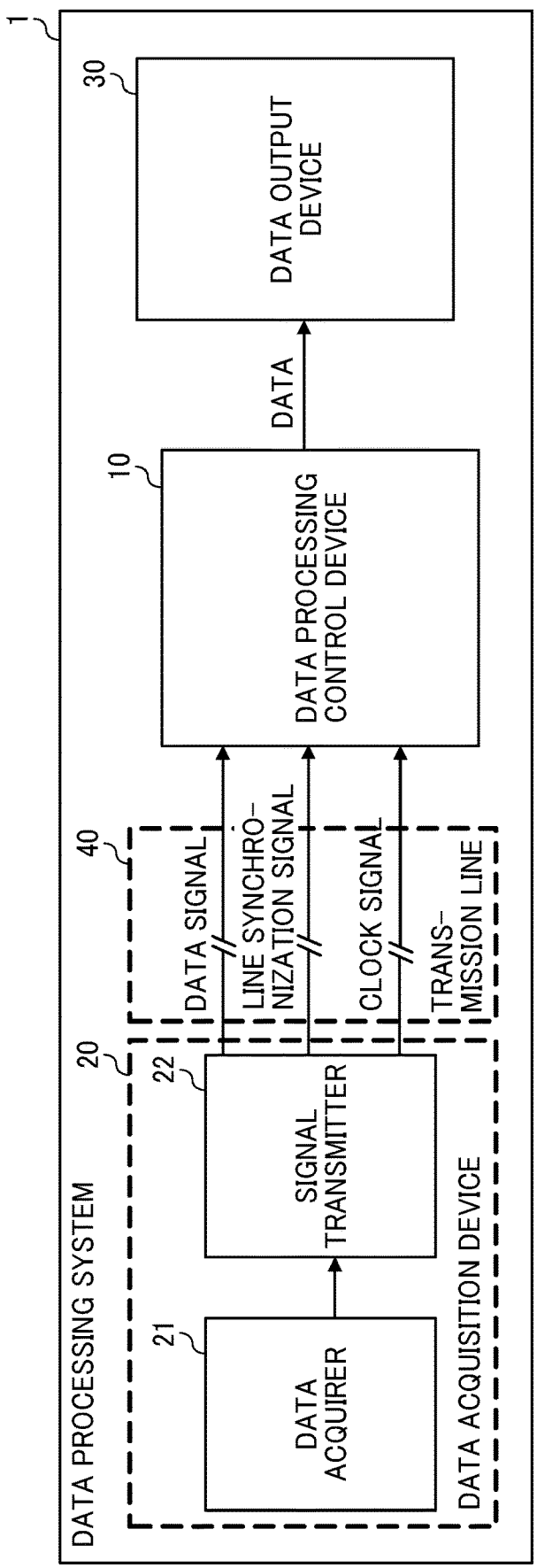
FIG. 1 is a configuration diagram illustrating an example of a data processing system including a data processing device according to the present disclosure.

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiment of Data Processing Device A data processing device according to the present disclosure is installed in an apparatus that performs predetermined data processing on data to be processed. For example, when the data processing device is installed in an image reading apparatus such as a scanner that optically reads an image formed on a recording medium and generates image data, the data processing device is disposed between an image reader and an image processor or another location. When the data processing device is installed in an image forming apparatus that forms an image on a recording medium, the data processing device is disposed between a data input section (or a data input device) that receives image data of an image to be formed from an external device and an image forming section (or an image forming device) or another location.

General Arrangement of Data Processing System

A general arrangement of a data processing system 1 to which a data processing control device 10 that is an embodiment of a data processing device according to the present disclosure is applicable is described. As illustrated in FIG. 1, the data processing system 1 includes the data processing control device 10, a data acquisition device 20, a data output device 30, and a transmission line 40.

The data acquisition device 20 includes a data acquirer 21 and a signal transmitter 22 and is mounted as, for example, a scanner. The data acquirer 21 corresponding to an image reader acquires data to be processed. The signal transmitter 22 converts the acquired data to be processed into a data signal and transmits the data signal to the data processing control device 10. The data processing control device 10 converts the data to be processed into data in a predetermined format and transmits the data in the predetermined format to the data output device 30. The data output device 30 generates image data from the data to be processed and outputs the image data.

When the data processing system 1 is, for example, an image forming apparatus, the data output device 30 corresponds to an image forming section that executes image formation processing to form an image on a recording medium and discharges the recording medium.

The transmission line 40 includes a cable that is a bundle of a plurality of signal lines to transmit a data signal, a line synchronization signal, and a clock signal from the data acquisition device 20 to the data processing control device 10, or a harness. The transmission impedance in the transmission line 40 is typically likely to increase, and hence noise is likely to be superimposed on the data signal or another signal during transmission. A measure to eliminate the influence of external noise may be taken for the cable or harness; however, it is difficult to completely eliminate the influence of noise because of static electricity or the like that is generated unexpectedly. Thus, the data processing control device 10 needs a measure to counter noise for the received data signal. The probability that the data signal is influenced by noise in the transmission line 40 increases as the length of the signal lines constituting the transmission line 40 increases.

The data processing control device 10 detects abnormality of a clock signal (external clock) transmitted together with data to be processed from an external device (in FIG. 1, the data acquisition device 20). The data processing control device 10 executes predetermined data processing to allow a downstream device (in FIG. 1, the data output device 30) to normally process the data to be processed when detecting abnormality of the external clock. For example, the data processing control device 10 can perform control not to output the data to be processed to the data output device 30 until a state is achieved where the data to be processed can be normally processed.

The data processing control device 10 detects abnormality of an external clock using a clock (internal clock) that is generated by an electronic oscillator (OSC) 120 mounted on the same circuit board as a circuit board having a function of executing the predetermined data processing.

The OSC 120 is disposed near a data processing controller included in the data processing control device 10. The length of the transmission line of the signal line for supplying the internal clock from the OSC 120 to the data processing controller is smaller than the length of the transmission line 40. Thus, the internal clock (OSC supply clock) supplied from the OSC 120 has a lower impedance than the impedance of the external clock, and is unlikely to receive the influence of noise such as static electricity compared with the external clock. That is, the internal clock (OSC supply clock) in the data processing control device 10 is a clock that does not have abnormality although the external clock is abnormal.

Thus, like the data processing control device 10, using an OSC supply clock with a low impedance as an operation clock of a data processing controller that detects abnormality of an external clock and performs predetermined data processing control can restrict control on the output of abnormal data to be processed to the downstream device. That is, when the data signal transmitted from the data acquisition device 20 is influenced by noise, the data processing control device 10 according to the present embodiment can eliminate the data in the influenced period (abnormal data) from processing targets in the downstream device, thereby avoiding taking-in of an abnormal signal (control signal or the like) and stabilizing the operation of the data processing system 1.

Data Processing Control Device

Figure 2:
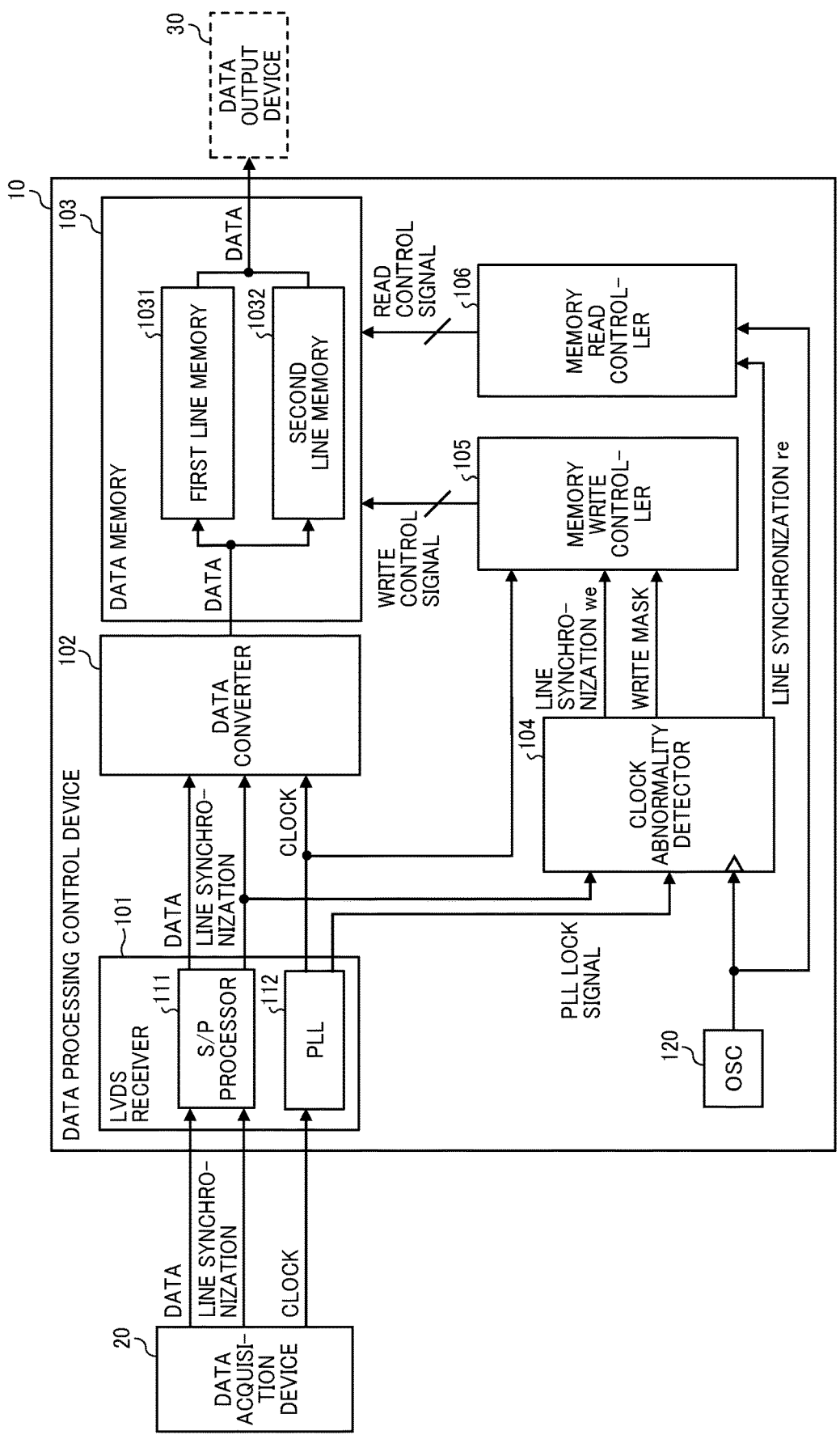
FIG. 2 is a configuration diagram illustrating an embodiment of the data processing device according to the present disclosure.

The data processing control device 10 that is an embodiment of the data processing device according to the present disclosure is described next with reference to FIG. 2. As illustrated in FIG. 2, the data processing control device 10 includes a low voltage differential signaling (LVDS) receiver 101 that receives a data signal from the data acquisition device 20, a data converter 102, a data memory 103, a clock abnormality detector 104, a memory write controller 105, and a memory read controller 106.

The LVDS receiver 101 includes a serial-to-parallel (S/P) processor 111 and a phase locked loop (PLL) 112. The LVDS receiver 101 is a receiving circuit that supports data transmission by an LVDS system and corresponds to a data receiver. Note that the LVDS system is a differential signal system that uses two transmission lines and transmits two different voltages. Both the voltages are compared with each other on the reception side. Using the LVDS system can reduce electro-magnetic interference (EMI).

The S/P processor 111 passes data included in a data signal and a line synchronization signal transmitted from the signal transmitter 22 to a downstream circuit. The PLL 112 generates an internal clock from a clock (external clock) included in the data signal transmitted from the signal transmitter 22 and passes the internal clock as a downstream clock to the downstream circuit. Thus, the PLL 112 corresponds to an internal clock generator including a PLL circuit and outputs a "PLL lock signal" when the external clock is normal.

When the data acquirer 21 (see FIG. 1) included in the data acquisition device 20 is an image sensor and is a data acquirer that outputs multibit data, for example, when the data acquirer 21 outputs 10-bit data for each of RGB, the data to be transmitted through the transmission line 40 is a 30-bit data signal. The data signal is required to be transmitted to the data processing control device 10. The LVDS receiver 101 is required to receive the 30-bit data signal.

When the 30-bit data signal is transmitted by a parallel transmission system, the number of signal-line cables (harnesses) of the transmission line 40 increases and the cost increases. To restrict this, a serial transmission system is used for transmission of multibit data. In the case of the serial transmission system, the signal transmitter 22 converts data from parallel data to serial data and transmits the converted data. The LVDS receiver 101 converts serial data into parallel data using the S/P processor 111, and passes the converted data to the downstream circuit.

Note that the "downstream circuit" includes the data converter 102 and the data memory 103 that constitute a data processor that executes predetermined data processing on data to be processed.

The data converter 102 converts the data to be processed into data in conformity with the input format of the data memory 103 based on the data to be processed and the line synchronization signal passed from the S/P processor 111 using the downstream clock passed from the PLL 112, and outputs the converted data.

The data memory 103 writes data in and reads (takes) data from two storage areas including a first line memory 1031 and a second line memory 1032. The data memory 103 switches an operation between a write operation and a read operation for data output from the data converter 102 alternately in and from the first line memory 1031 and the second line memory 1032. Thus, the data memory 103 stores all input data.

The clock abnormality detector 104 operates based on the "OSC supply clock" supplied from the OSC 120 to detect "lock release" of a PLL lock signal relating to the external clock passed from the PLL 112. That is, the clock abnormality detector 104 operates based on a clock supplied from an oscillation circuit of a system different from that of the external clock to detect abnormality in the PLL 112 of the LVDS receiver 101. Note that the configuration to supply the operation clock to the clock abnormality detector 104 need not be an oscillation circuit such as the OSC 120. The method and configuration of generating the operation clock are not limited as long as the operation clock is suppliable in a system different from that of the external clock.

The clock abnormality detector 104 outputs a line synchronization we signal and a write mask signal to the memory write controller 105. The clock abnormality detector 104 also outputs a line synchronization re signal to the memory read controller 106.

While abnormality of a clock caused by superimposition of noise is detected based on "lock release" of the PLL 112 included in the LVDS receiver 101, another measure may detect abnormality of data to be processed or a unit control signal (for example, a line synchronization signal) determining a processing unit.

The memory write controller 105 controls the write operation performed alternately in the first line memory 1031 and the second line memory 1032. The memory write controller 105 operates using a clock generated from the external clock. The memory write controller 105 stops the write operation to the data memory 103 in a period in which the clock abnormality detector 104 detects abnormality of the clock (PLL lock release). In this case, the memory read controller 106 continues the read operation.

The memory read controller 106 controls the read operation performed alternately from the first line memory 1031 and the second line memory 1032. The memory read controller 106 operates using the internal clock supplied from the OSC 120. The memory read controller 106 stops the read operation from the data memory 103 in a period in which the clock abnormality detector 104 detects abnormality of the clock (PLL lock release). The memory read controller 106 also stops taking in the line synchronization signal. The "read operation" in this case is an operation of outputting data to be processed to the data output device 30. In other words, the "read operation" corresponds to an operation of taking in data to be processed in the data output device 30.

The memory read controller 106 resumes the write operation when the "lock release" in the PLL 112 is recovered (when the state turns to normal) and when the memory read controller 106 receives the next unit control signal.

Thus, in a case where the data to be processed is, for example, image data, the output of the image with abnormality is restricted and the operation of the whole system can be stabilized.

Figure 3:
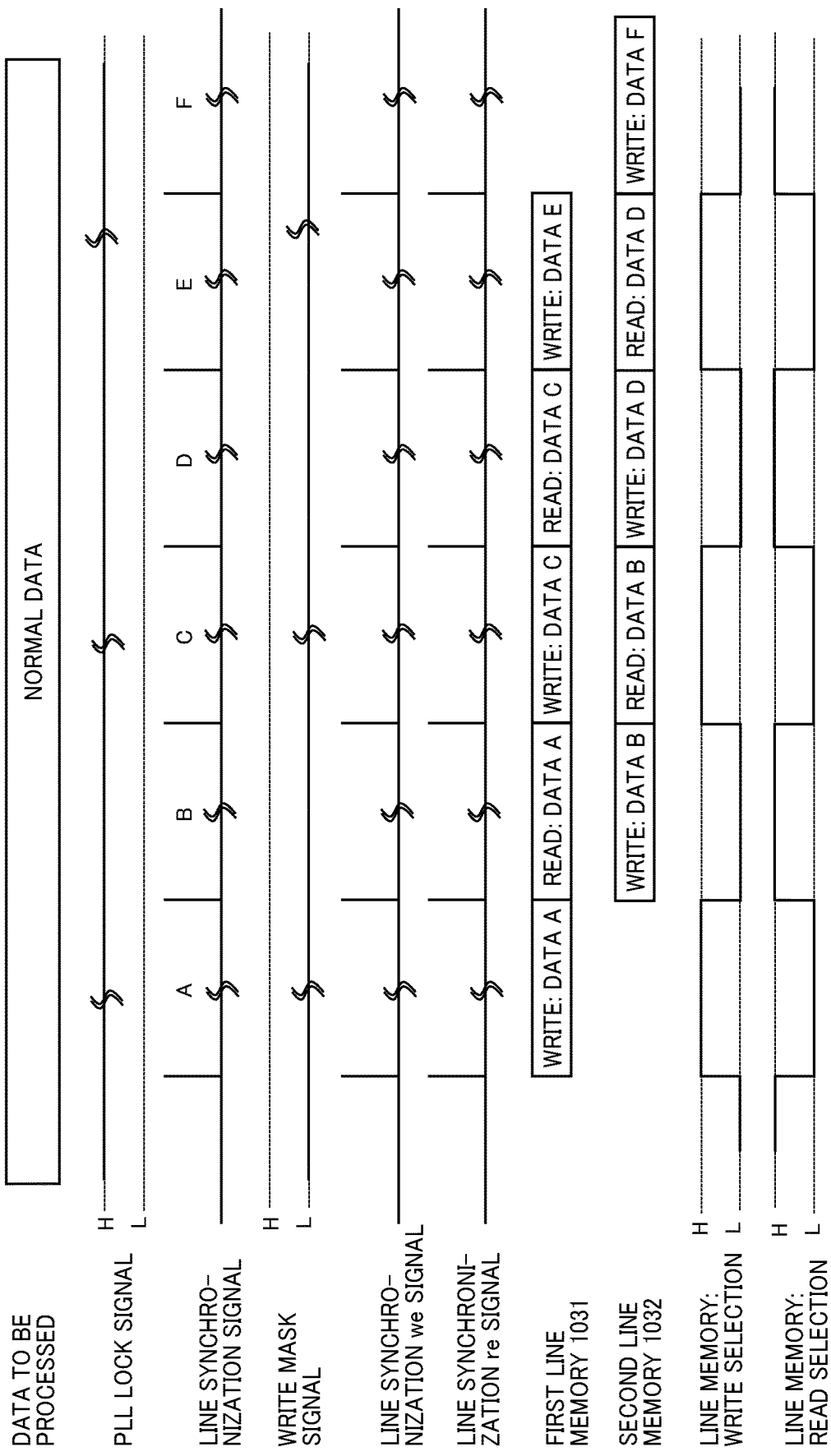
FIG. 3 is a timing chart illustrating an example of a write operation and a read operation for data according to the embodiment of the data processing device.

Described below are the flows of a read operation and a write operation in a normal situation and then a taking-in operation of data to be processed (by the read operation and the write operation) using the data converter 102, the data memory 103, the memory write controller 105, and the memory read controller 106 included in the data processing control device 10 according to the present embodiment. FIG. 3 is a timing chart illustrating the states of the write operation and the read operation. In the following description, FIG. 3 illustrates a case where the signals (the clock signal and the line synchronization signal) received from the data acquisition device 20 are not influenced by noise and the data to be processed is also received as normal data.

Referring to FIG. 3, "data to be processed" exemplifies data included in a data signal normally received by the LVDS receiver 101 continuously for a predetermined duration.

Referring to FIG. 3, "PLL lock signal" exemplifies a signal that is output from the PLL 112 of the LVDS receiver 101. The PLL lock signal is output as "H" when the lock of the external clock is not released (when the external clock is not influenced by noise).

Referring to FIG. 3, "line synchronization signal" exemplifies a signal that is passed from the S/P processor 111 to the data converter 102.

Referring to FIG. 3, "write mask signal" exemplifies a signal that is passed from the clock abnormality detector 104 to the memory write controller 105. The write mask signal is output as "L" when the lock release does not occur (when the PLL lock signal is "H").

Referring to FIG. 3, "line synchronization we signal" exemplifies a signal that is passed from the clock abnormality detector 104 to the memory write controller 105. The write operation in the data memory 103 is performed for data to be processed in a unit determined by the unit control signal with reference to the line synchronization we signal. With the line synchronization we signal, the write operation is alternately switched to the first line memory 1031 and the second line memory 1032 included in the data memory 103.

Referring to FIG. 3, "line synchronization re signal" exemplifies a signal that is passed from the clock abnormality detector 104 to the memory read controller 106. With the line synchronization re signal, the read operation is alternately switched to the first line memory 1031 and the second line memory 1032 included in the data memory 103. Thus, the data to be processed taken in to the data memory 103 can be sequentially taken out.

FIG. 3 illustrates timing of the write operation for the data to be processed in the data memory 103. In this case, the data to be processed is output based on the unit control signal from the data converter 102. In the present embodiment, the data to be processed is indicated in the order of writing data from the first line memory 1031. Thus, the data to be processed in a period corresponding to "A" of the line synchronization signal is written as "data A" in the first line memory 1031 of the data memory 103. Then, the data to be processed in a period corresponding to "B" of the line synchronization signal is written as "data B" in the second line memory 1032. The write operations are alternately performed.

FIG. 3 also illustrates timing of taking in the line synchronization signal in the data memory 103. The line synchronization signal is output as the unit control signal determining the processing unit for the data to be processed in the S/P processor 111. In synchronization with the line synchronization signal, selection is switched between write selection (write operation) and read selection (read operation) and is applied alternately to the first line memory 1031 and the second line memory 1032 included in the data memory 103.

First Embodiment

Figure 4:
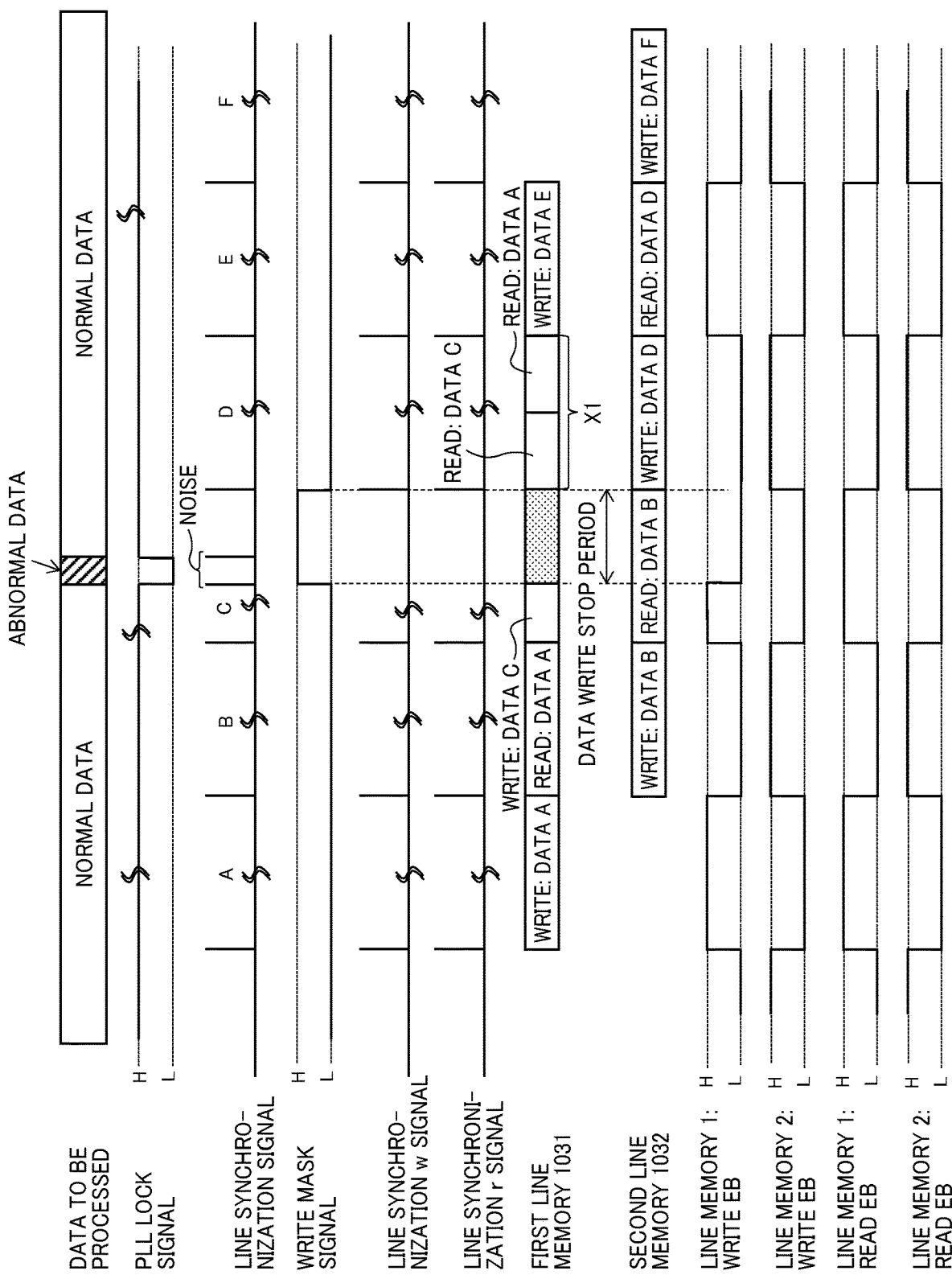
FIG. 4 is a timing chart illustrating another example of a write operation and a read operation for data according to the embodiment of the data processing device.

FIG. 4 illustrates a case where the signals (the clock signal and the line synchronization signal) received from the data acquisition device 20 are influenced by noise, such as superimposition of noise on the signals, and the data to be processed is received in a state including abnormal data.

Referring to FIG. 4, "data to be processed" exemplifies data to be processed with abnormality occurring because of the influence of noise or the like in one line (an example of the control unit) included in the data to be processed.

Referring to FIG. 4, "PLL lock signal" is possibly in a state in which "lock release" occurs in a period with abnormality, the signal level in the period is changed to "L" from "H", and part of "data C" corresponding to the period is abnormal. The data processing control device 10 performs processing to leave image data in a normal range (normal data) as much as possible without taking in image data in an abnormal range (abnormal data). Thus, the abnormality of the image is hardly recognized even when the data output device 30 outputs the image data using the data to be processed output from the data processing control device 10. That is, the influence of abnormality on the output data can be restricted.

As illustrated in FIG. 4, the clock abnormality detector 104 asserts "write mask signal" (changes the level to "H" level) in a period in which the PLL lock signal is "L", that is, in a period in which "lock release" occurs. Thus, the write operation for the data to be processed is stopped in "data write stop period" illustrated in FIG. 4.

Moreover, the data to be processed (data A) that is two lines before the subject line (two control units before the subject control unit) is left in the data memory 103 in the period in which the write operation is stopped. In this case, data (data two lines before data of the subject line) different from the data (period) expected to be taken in is taken in. However, the influence on the output data is small unless the taken-in data does not significantly change the whole data to be processed.

For example, in the case of image data, a document that significantly changes image data in the period of two lines may be a halftone dotted document. However, a document in which abnormality is recognizable such as a halftone dotted document is less frequently used for documents typically used in office. In general, the probability of occurrence of abnormality in an external clock because of static electricity or the like is low. Thus, the probability that a document in which abnormality of the document to be output (image) is recognizable is output when abnormality occurs because of noise is further low. Thus, the data processing control device 10 according to the present embodiment can restrict occurrence of abnormality of the data to be processed.

Note that, as illustrated in FIG. 4, when the state is recovered from the lock release and the PLL lock signal is changed from "L" to "H", the write operation is resumed. Resumption of the write operation and taking-in of a "line synchronization w control signal" and a "line synchronization r control signal" when abnormality occurs in a clock are described now.

As illustrated in FIG. 4, the write operation is performed in a period in which a "write EB (enable) signal" is asserted. When abnormality occurs in a clock (in the case of lock release and when the PLL lock signal is "L"), the "write mask signal" is changed to "H", and "write EB" is stopped in the period.

When the write operation that is a data write operation in the data memory 103 resumes in the middle of the section (in the middle of the line) of the unit control signal (the line synchronization signal), the "write EB signal" may be also abnormal because of the influence of abnormality in an external clock. Thus, the write operation may be performed by the data memory 103 in an unintentional state. For example, data may be written in an unintentional memory address. Moreover, when the "line synchronization signal" changes at unintentional timing because of the influence of noise or the like, abnormality may occur in the data processing system 1 including the data processing control device 10. Thus, in the present embodiment, the "line synchronization w control signal" is not to be taken in when abnormality occurs in a clock.

For example, in a period in which the "write mask signal" is "H", taking-in of the "line synchronization signal" is stopped. Thus, the "line synchronization w control signal" and the "line synchronization r control signal" do not change. When the PLL lock signal becomes normal, the "write mask signal" is recovered (negated) using the next "line synchronization signal". Consequently, the write control signal output from the memory write controller 105 is initialized using the "line synchronization w control signal". Accordingly, a normal operation is available thereafter.

Second Embodiment

Figure 5:
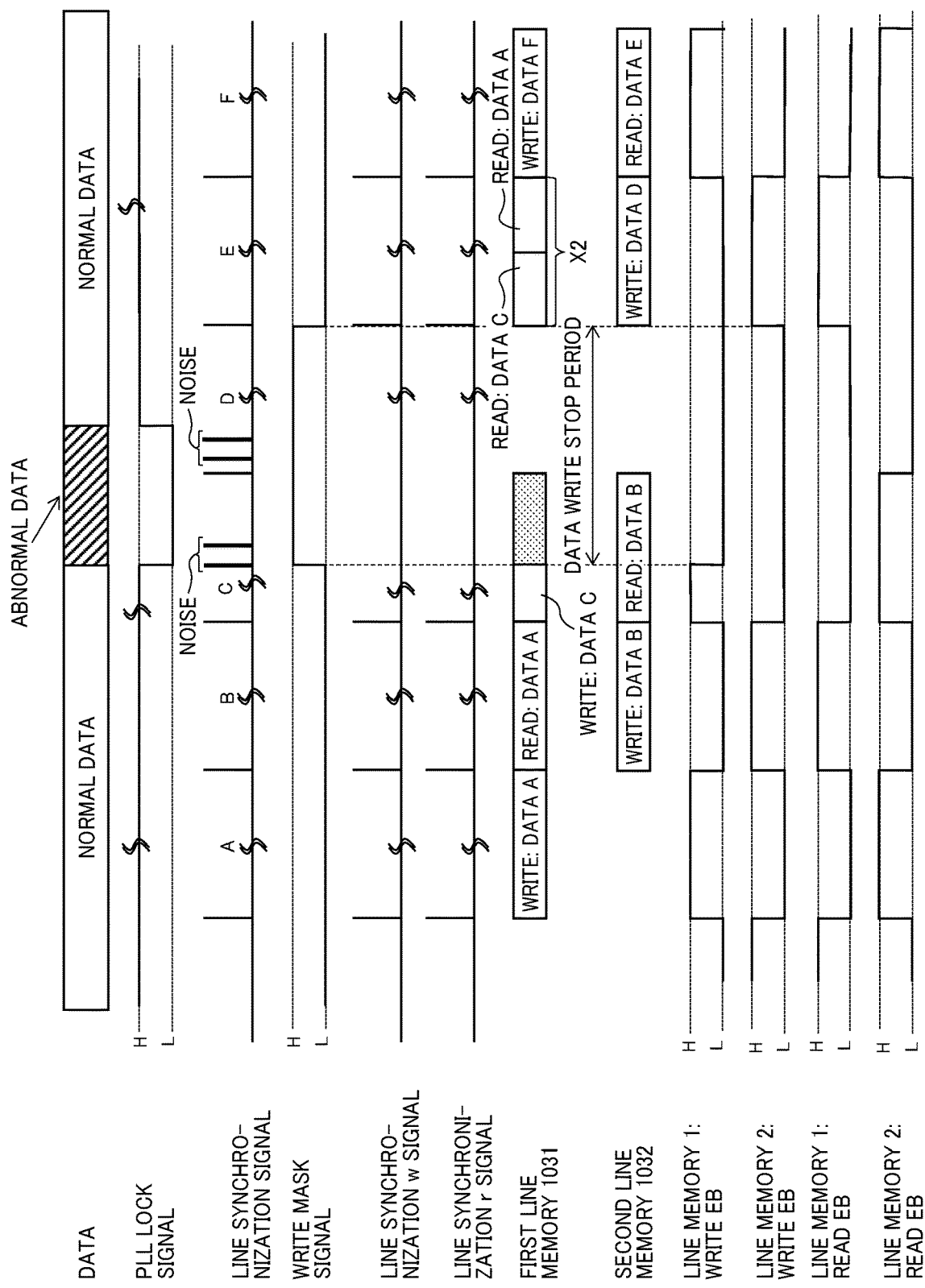
FIG. 5 is a timing chart illustrating still another example of a write operation and a read operation for data according to the embodiment of the data processing device.

FIG. 5 illustrates another exemplary case where the signals (the clock signal and the line synchronization signal) received from the data acquisition device 20 are influenced by noise, such as superimposition of noise on the signals, and the data to be processed is received in a state including abnormal data. Referring to FIG. 5, "data to be processed" exemplifies data to be processed with abnormality occurring because of the influence of noise or the like in a period exceeding one line (an example of the control unit) included in the data to be processed.

FIG. 5 illustrates a case where the period in which abnormality occurs in the external clock extends beyond the period of the unit control signal even though the extension temporarily occurs (in a case where abnormality occurs in a range equal to or more than one line). As illustrated in FIG. 5, although the period in which the PLL lock signal is "L" partly appears, the data to be processed corresponding to the period (in FIG. 5, data C and data D) may become abnormal data.

Description is given compared with the case of "occurrence of abnormality within one line" illustrated in FIG. 4. The write operation for the data to be processed is stopped in a "data write stop period" illustrated in FIG. 5 in a case where abnormality occurs beyond the processing unit. In a case where the period in which the write operation is stopped is in the middle of the write operation for the data C as illustrated in FIG. 5, the "data A" that has been previously written is left in the storage area corresponding to the memory address in the stop period and later. In this case, the data A is data two periods before (two lines before) in the processing unit.

Thus, in the "data write stop period" illustrated in FIG. 5, since the "PLL lock signal" is "L" beyond the "line synchronization signal" indicative of the operation period on the data D, taking-in of the "line synchronization signal" is stopped. Consequently, the data D is eliminated, and the amount of data is reduced by the amount corresponding to the one processing unit (the amount corresponding to one line).

Although described in the first embodiment, the probability of occurrence of the influence of noise is typically small. In many cases, the PLL lock signal is recovered within one line, and the influence on the data processing system 1 is small.

Thus, processing is performed not to take in the control signal (the line synchronization signal) that is possibly abnormal even when abnormality occurs in the external clock at timing beyond the processing unit, and hence the data processing system 1 can stably operate.

Third Embodiment

Figure 6:
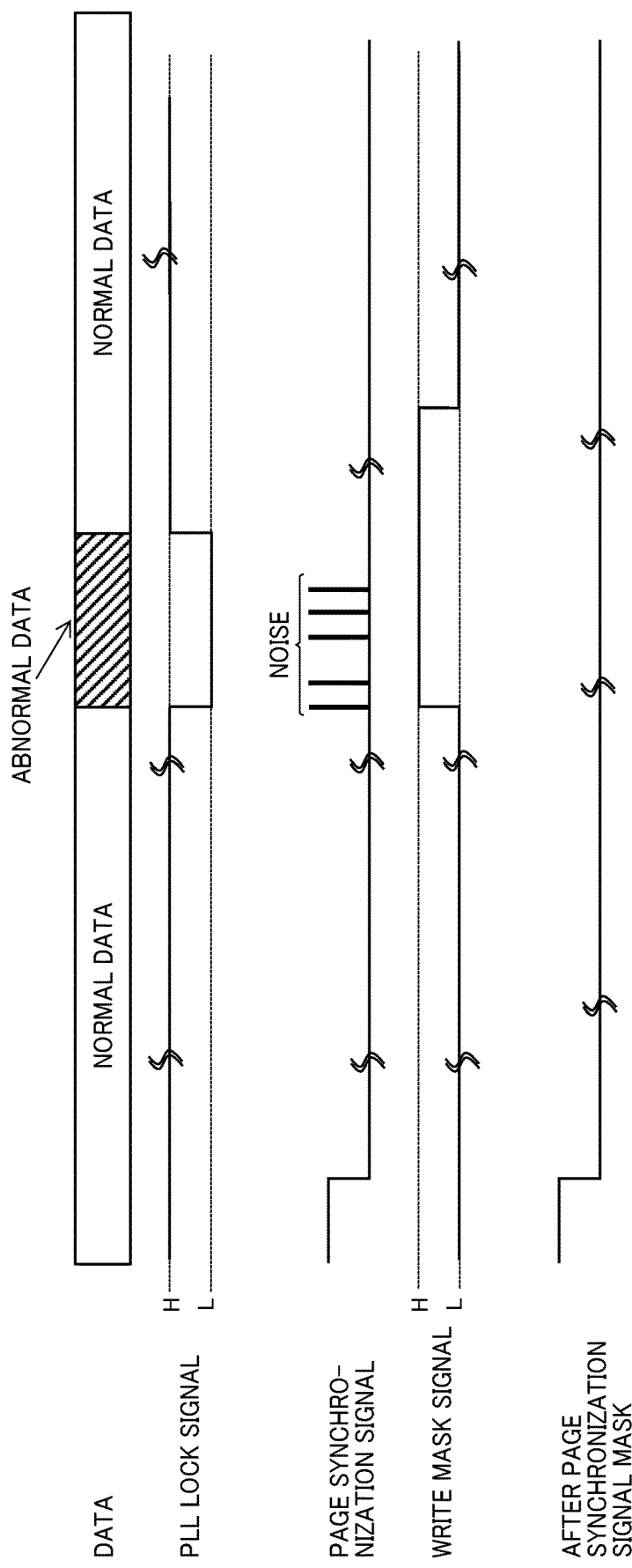
FIG. 6 is a timing chart illustrating yet another example of a write operation and a read operation for data according to the embodiment of the data processing device.

FIG. 6 illustrates still another exemplary case where the signals (the clock signal and the line synchronization signal) received from the data acquisition device 20 are influenced by noise, such as superimposition of noise on the signals, and the data to be processed is received in a state including abnormal data.

In a case where the processing unit is the unit of a page instead of the unit of a line, as illustrated in FIG. 6, the write mask signal is changed to "H" when abnormality occurs in an external clock and the PLL lock signal is changed to "L". In the period in which the "write mask signal" is "H", the "page synchronization signal" is not to be taken in.

Thus, with the data processing control device 10 according to the present embodiment, when the processing unit is the unit of a page, the page synchronization signal with the influence of noise is not to be taken in and is further stably operable.

Figure 7:
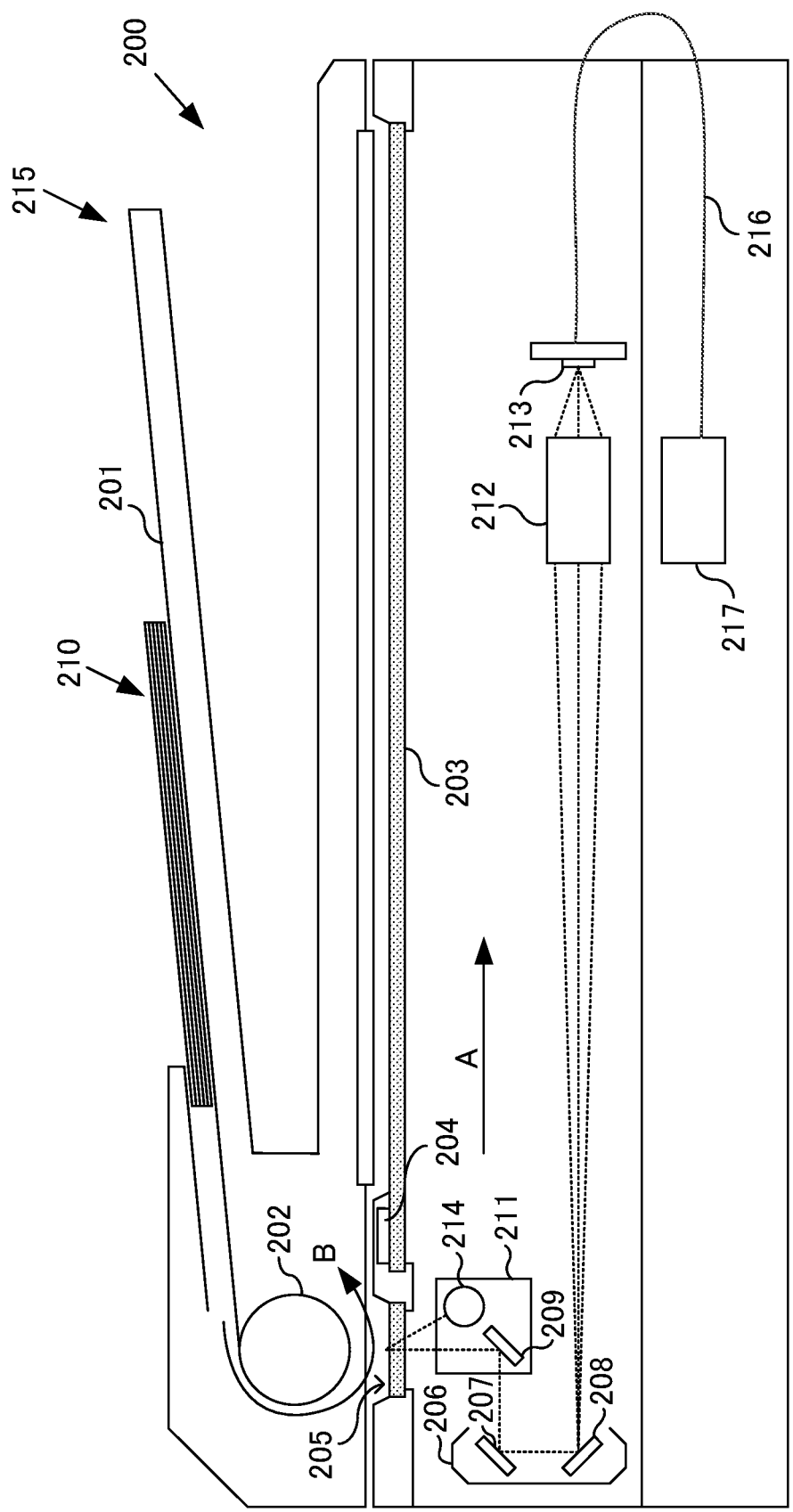
FIG. 7 is a configuration diagram illustrating an embodiment of an image reading apparatus according to the present disclosure.

Embodiment of Image Reading Apparatus An embodiment of an image reading apparatus according to the present disclosure is described next with reference to FIG. 7. FIG. 7 is a cross-sectional view illustrating an example of a configuration of a scanner apparatus 200 according to the present embodiment. The scanner apparatus 200 is an apparatus installed in an image forming apparatus, such as a digital copier, a digital multifunction peripheral, or a facsimile apparatus; or a dedicated apparatus, and includes at least the above-described data acquisition device 20, transmission line 40, and data processing control device 10.

The scanner apparatus 200 includes a contact glass 203 having an upper surface on which a document is placed. Furthermore, the scanner apparatus 200 includes a first carriage 211 and a second carriage 206. The first carriage 211 includes a light source 214 for exposing a document to light and a first reflecting mirror 209. The second carriage 206 includes a second reflecting mirror 207 and a third reflecting mirror 208. The scanner apparatus 200 also includes a lens unit 212 for causing light reflected by the third reflecting mirror 208 to be focused on a light receiving area of an imaging element 213.

The scanner apparatus 200 further includes a reference member 204 having a reference density of such as a reference white board that is used to correct various kinds of distortion because of a reading optical system or the like, and a sheet-through reading slit 205. The reference member 204 can be illuminated by the light source 214 and is disposed at a position different from the positions of the contact glass 203 and the sheet-through reading slit 205 situated at document illumination positions.

The imaging element 213 receives, as incident light, reflected light from either of a document placed on the contact glass 203, a document that passes through the sheet-through reading slit 205, and the reference member 204.

An automatic document feeder (ADF) 215 is installed in an upper section of the scanner apparatus 200. The ADF 215 is coupled to be openable and closable with respect to the contact glass 203 via a hinge or the like. The ADF 215 includes a document tray 201 serving as a document table on which a document bundle 210 including a plurality of documents can be placed. The ADF 215 also includes a separation feeder including a feeding roller 202 that separates the documents one by one from the document bundle 210 placed on the document tray 201 and automatically feeds the separated document toward the sheet-through reading slit 205.

An operation in a scan mode of the scanner apparatus 200 including the above-described configuration is described. The operation in the scan mode scans an image surface of the document placed on the contact glass 203 and reads the image of the document.

In the scan mode, the first carriage 211 and the second carriage 206 are moved in a direction indicated by arrow A (sub-scanning direction) by a stepping motor to scan the document. In this case, the second carriage 206 moves at a speed that is half the speed of the first carriage 211 to keep the optical-path length from the contact glass 203 to the light receiving area of the imaging element 213 constant.

Simultaneously, the image surface that is a lower surface of the document set on the contact glass 203 is illuminated (exposed to light) by the light source 214 of the first carriage 211. Then, the reflected light from the image surface is sequentially reflected by the first reflecting mirror 209 of the first carriage 211, and the second reflecting mirror 207 and the third reflecting mirror 208 of the second carriage 206. Then, the reflected light beam from the third reflecting mirror 208 is focused by the lens unit 212 and forms an image on the light receiving area of the imaging element 213.

The imaging element 213 photoelectrically converts the amount of received light of respective pixels in the unit of one line into an analog electric signal and outputs the electric signal. The electric signal is converted into a digital signal, the gain of the digital signal is adjusted, and image data obtained by reading the image of the document is output. The image data is transmitted to a substrate 217 including the above-described data processing control device 10 and so forth via a cable harness 216. When the cable harness 216 is long, the transmission impedance is high, and hence the cable harness 216 is easily influenced by noise.

An operation in a sheet-through mode is described next. In the sheet-through mode, a document is automatically fed by the ADF 215 and the image of the moving document is read.

In the sheet-through mode, the first carriage 211 and the second carriage 206 are moved to positions below the sheet-through reading slit 205 and are stopped. Then the documents are automatically sequentially fed in the order from the bottom document of the document bundle 210 placed on the document tray 201 in a direction indicated by arrow B (sub-scanning direction) by the feeding roller 202, and the document is scanned when the document passes through the position of the sheet-through reading slit 205.

At this time, the lower surface (image surface) of the automatically fed document is illuminated by the light source 214 of the first carriage 211. Then, the reflected light from the image surface is sequentially reflected by the first reflecting mirror 209 of the first carriage 211, and the second reflecting mirror 207 and the third reflecting mirror 208 of the second carriage 206. Then, the reflected light beam from the third reflecting mirror 208 is focused by the lens unit 212 and forms an image on the imaging element 213.

The imaging element 213 photoelectrically converts the amount of received light of respective pixels in the unit of one line into an analog electric signal and outputs the electric signal. The electric signal is converted into a digital signal, the gain of the digital signal is adjusted, and image data obtained by reading the image of the document is output. The image data is transmitted to the substrate 217 including the above-described data processing control device 10 and so forth via a cable harness 216. The document whose image has been read is discharged to a discharge port.

Note that, before the image is read in the scan mode or the sheet-through mode, the imaging element 213 reads an image using reflected light from the reference member 204 that is illuminated by the turned-on light source 214. To cause the level of respective pixels of the image data for one line to be a predetermined level, data for shading correction is generated and stored in the imaging element 213. Then, when the image of the document is read, shading correction is performed on the image data read by the imaging element 213, based on the previously stored data for shading correction. When the ADF 215 includes a transporting belt, the document can be automatically fed by the ADF 215 to a reading position on the contact glass 203, and the image of the document can be read even in the scan mode.

Embodiment of Image Forming Apparatus

Figure 8:
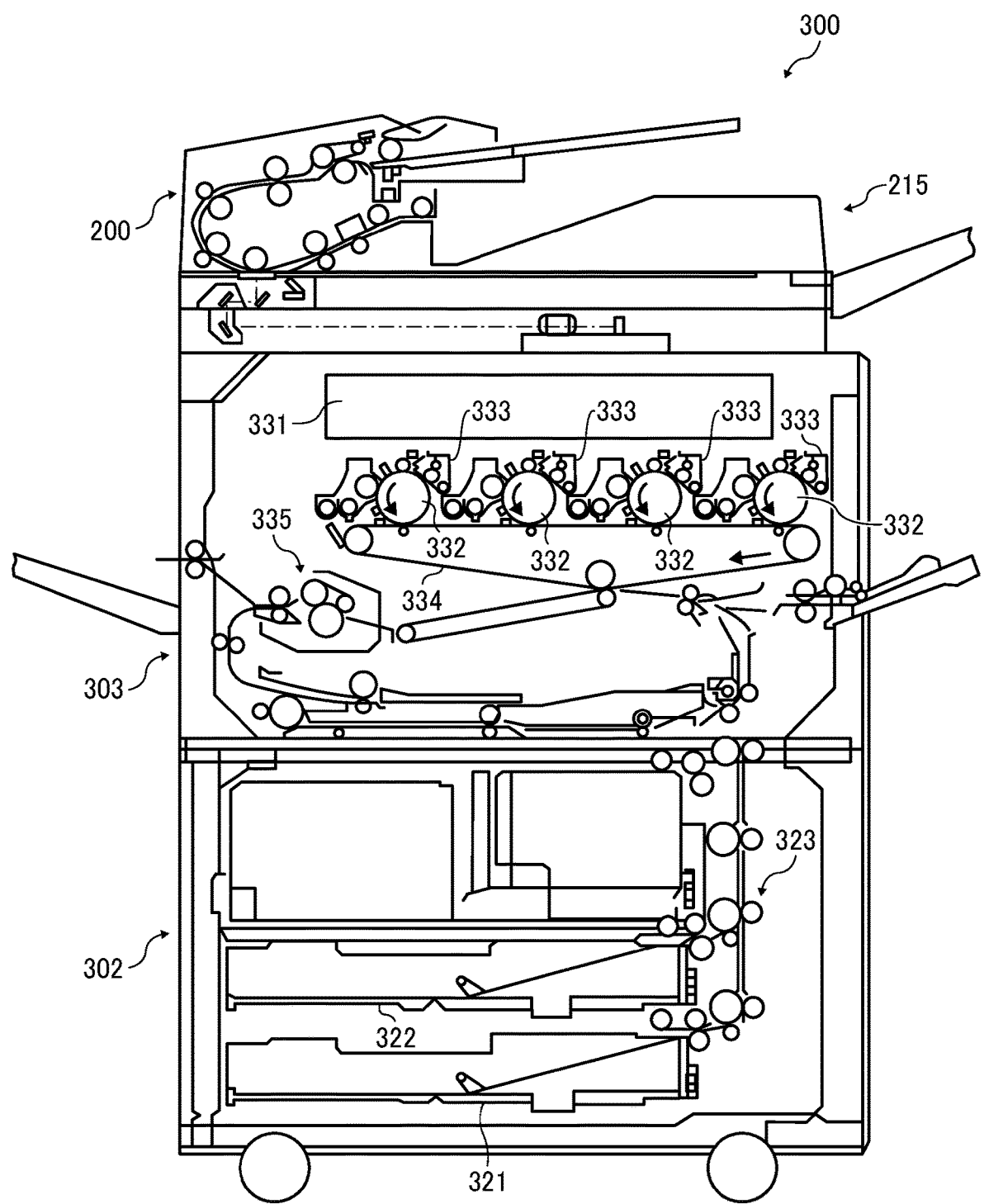
FIG. 8 is a configuration diagram illustrating an embodiment of an image forming apparatus according to the present disclosure.

An image forming apparatus according to the present disclosure is described next with reference to FIG. 8. FIG. 8 is a cross-sectional view illustrating an example of a configuration of a multifunction peripheral (MFP) 300 according to the present embodiment. The MPF 300 includes at least the above-described data acquisition device 20, transmission line 40, and data processing control device 10.

The MFP 300 includes the above-described scanner apparatus 200, a sheet feeding section 302, and an image forming section 303. The sheet feeding section 302 includes sheet feeding cassettes 321 and 322 that house recording sheets with different sheet sizes, and a sheet feeder 323 including various types of rollers that transport the recording sheets housed in the sheet feeding cassettes 321 and 322 to an image formation position of the image forming section 303. The image forming section 303 includes an exposure device 331, a photoconductor drum 332, a developing device 333, a transfer belt 334, and a fixing device 335.

The image forming section 303 exposes the photoconductor drum 332 to light using the exposure device 331 to form a latent image on the photoconductor drum 332, and supplies toners of different colors onto the photoconductor drum 332 using the developing device 333 to develop an image based on image data of the document read by the image reader in the ADF 215.

The image forming section 303 transfers the image developed on the photoconductor drum 332 by the transfer belt 334 onto the recording sheet fed from the sheet feeding section 302, and then melts the toner of the toner image transferred on the recording sheet by the fixing device 335 to fix the color image onto the recording sheet.

The MFP 300 has a function of processing the image data read by the scanner apparatus 200 in the image forming section 303, forming an image on a recording medium, and discharging the recording medium. Accordingly, the above-described data processing control device 10 can be applied also to the MFP 300. Thus, an appropriate image can be obtained.

The present disclosure is not limited to the embodiments described above, and various modifications can be made within the range not departing from the technical scope of the present disclosure. All the technical matters included in the technical idea as set forth in the appended claims are included in the present disclosure. The above-described embodiments provide desirable examples. A person skilled in the art can implement various modifications from the disclosed contents. Such modifications are also included in the technical scope as set forth in the appended claims.

This patent application is based on and claims priority pursuant to 35 U.S.C. § 119(a) to Japanese Patent Application No. 2019-225642, filed on Dec. 13, 2019, in the Japan Patent Office, the entire disclosure of which is hereby incorporated by reference herein.

REFERENCE SIGNS LIST 1 data processing system
10 data processing control device
20 data acquisition device
21 data acquirer
22 signal transmitter
30 data output device
40 transmission line
101 LVDS receiver
102 data converter
103 data memory
104 clock abnormality detector
105 memory write controller
106 memory read controller
111 S/P processor
112 PLL
200 scanner apparatus
201 document tray
202 feeding roller
203 contact glass
204 reference member
205 sheet-through reading slit
206 second carriage
207 second reflecting mirror
208 third reflecting mirror
209 first reflecting mirror
210 document bundle
211 first carriage
212 lens unit
213 imaging element
214 light source
216 cable harness
217 substrate
300 MFP
302 sheet feeding section
303 image forming section
321 sheet feeding cassette
322 sheet feeding cassette
323 sheet feeder
331 exposure device
332 photoconductor drum
333 developing device
334 transfer belt
335 fixing device
1031 first line memory
1032 second line memory

The invention claimed is:

1. A data processing control device comprising:
a data receiver configured to receive data to be processed, an external clock generated externally from the data processing control device, and a unit control signal determining a processing unit as an amount of the data to be processed, the data receiver including a phase locked loop (PLL) circuit configured to receive the external clock;
a clock abnormality detector configured to receive a lock signal output from the PLL circuit and the unit control signal and operate based on a clock different from the external clock and output a write synchronization signal, a read synchronization signal and a write mask signal based on the lock signal and the unit control signal;
a memory write controller configured to produce a write control signal based on the write synchronization signal and the write mask signal;
a memory read controller configured to produce a read control signal based on the read synchronization signal; and
a first memory and a second memory configured to alternatively write and read the data to be processed based on the write control signal and the read control signal,
wherein when abnormality of the external clock occurs, the memory write controller produces the write control signal to stop writing of the data to be processed in the first memory or the second memory, and
when the external clock becomes normal again, to take in the unit control signal, the memory write controller produces the write control signal to write the data to be processed in the first memory or the second memory.

2. The data processing control device according to claim 1, wherein, when the clock abnormality detector detects abnormality of the external clock, the data processing circuitry stops taking in the unit control signal.

3. The data processing control device according to claim 1, wherein the data to be processed includes image data, and the unit control signal includes a line synchronization signal determining a line unit for the image data.

4. The data processing control device according to claim 1, wherein the data to be processed includes image data, and the unit control signal includes a page synchronization signal determining a page unit for the image data.

5. The data processing control device according to claim 1, wherein the data to be processed is transmitted by a low voltage differential signaling (LVDS) system, and the data receiver configured to receive the data to be processed includes an LVDS receiver.

6. An image reading apparatus configured to optically read an image, the image reading apparatus comprising:
data acquisition circuitry configured to transmit optically read image data together with a clock signal; and
a data processing control device according to claim 1, the data processing control device being configured to receive the image data as the data to be processed, the clock signal as the external clock, and the unit control signal determining the processing unit as the amount of the image data to be processed from the data acquisition circuitry, and execute processing on the image data.

7. An image forming apparatus comprising:
an image former configured to form an image on a recording medium using the data processed by the data processing control device according to claim 1.

8. The image forming apparatus according to claim 7, further comprising:

an automatic document feeder (ADF) to automatically provide pages of documents to the image former to form images of the pages of the documents.

9. The image forming apparatus according to claim 7, wherein the image forming apparatus is a multifunction peripheral.

10. The data processing control device according to claim 1, wherein the clock different from the external clock is generated internally in the data processing control device.

11. The data processing control device according to claim 10, wherein the clock different from the external clock is generated by an oscillator of the data processing control device.

12. A method for processing data performed by a data processing control device, the method comprising:

receiving data to be processed, an external clock generated externally from the data processing control device, and a unit control signal determining a processing unit as an amount of the data to be processed, the external clock being received by a PLL circuit;

receiving a lock signal from the PLL circuit and the unit control signal and operating based on a clock different from the external clock and outputting a write synchronization signal, a read synchronization signal and a write mask signal based on the lock signal and the unit control signal;

producing a write control signal based on the write synchronization signal and the write mask signal;

producing a read control signal based on the read synchronization signal; and alternatively write and read the data to be processed to or from a first memory and a second memory based on the write control signal and the read control signal, wherein, when abnormality of the external clock occurs, the method further comprises:

producing the write control signal to stop writing of the data to be processed in the first memory or in the second memory, and when the external clock becomes normal again, taking in the unit control signal, producing the write control signal to write the data to be processed in the first memory or the second memory.

* * * * *